United States Patent Office 3,301,997
Patented Jan. 31, 1967

3,301,997
METHOD OF WELDING DUCTILE IRON
William F. Semenchuk, Toronto, Ontario, Canada, assignor to Canada Iron Foundries, Limited, Montreal, Quebec, Canada
No Drawing. Filed Feb. 15, 1965, Ser. No. 432,869
2 Claims. (Cl. 219—137)

This invention relates to a method of welding ductile iron.

The advantages of ductile iron (otherwise known as spheroidal graphite iron) over ordinary gray iron from which it is derived have been recognized since the discovery of this material was announced in the late 1940's.

During the past few years ductile iron has begun to establish itself as an engineering material and has replaced carbon steel in some structural applications. Consequently, the demand for a reliable method of welding this material increases constantly, but no such method has been proposed to date.

A particular problem in the welding of ductile iron results from the formation of heat affected zones in the iron. These zones are complex in structure and usually include several constituents. Thus, martensite, primary carbide and austenite, as well as partly dissolved spherical graphite are found in these heat affected zones. The main disadvantage of these zones is that they are far harder than the ductile iron material itself and are brittle. Consequently these welds are unable to withstand shocks, readily fracturing when subjected, for example, to a "notch" test.

To soften these structures many post-weld treatments have been proposed but however carefully these treatments are carried out the zones only regain part of their original ductility, and the ductility regained is a quantity which is virtually impossible to control so that the welding results vary from weld to weld and cannot readily be reproduced.

Of the methods previously proposed for enabling ductile iron to be welded, two are commonly used. The first is an oxyacetylene method in which cast iron filler metal is manually added to the joint. This method, if any success is to be achieved, requires the maintenance of very high preheat temperatures. A successful weld of this type has a grain structure that matches the structure of the ductile iron quite closely but, as mentioned above, the resultant welds are generally brittle. Furthermore, the success or otherwise of the weld cannot be predicted and even the best weld achieved by this method is likely to fail under impact due to its brittleness.

The second method being used employs a shielded metal arc, the welding being performed electrically with coated wire electrodes of nickel or nickel alloy compositions. The ductile iron requires moderate preheating to prevent cracking of the metal in the joint area during welding. The second method can more readily be performed than the first method described but once again the results cannot be considered to be wholly satisfactory. The problem outlined above is particularly pronounced when this second method is employed, that is, the loss of ductility across the joint is severe. In addition, the electrodes that have been developed for this second welding method have relatively high tensile and yield strengths so that there is a strong tendency for the weld to fracture in the fusion zone, where the base metal goes into solution in the welding metal, unless moderate preheat temperatures are maintained during welding and the welds are cooled slowly after welding is completed.

The present invention seeks to provide a new and reliable method of welding ductile iron without resorting to preheat and post-weld heat treatments.

Stated broadly, the ductile iron welding method according to the present invention employs weld metal which when deposited has a tensile strength of 60,000 to 65,000 p.s.i., a yield strength not exceeding 52,000 p.s.i. and an elongation of at least 8% in 1.4 inches.

The invention will now be described in more detail with reference to the following example.

Ductile iron plate material in its annealed condition was used. The material was in plates ⅝" thick and was chamfered by machining J bevels along one of its edges. Two similarly chamfered plates were fitted on a backing plate with their bevelled edges facing one another and with a slight gap between them to allow for access to the root area immediately above the backing.

The ductile iron had the following chemical composition:

| | Percent |
|---|---|
| Carbon | 3.65 |
| Manganese | 0.39 |
| Silicon | 2.60 |
| Phosphorus | 0.029 |
| Sulphur | 0.022 |
| Magnesium | 0.045 |
| Iron | Balance |

The assembled plates were then put in a suitable fixture to prevent relative movement of the plates during welding. The plates were not preheated before welding was commenced so that they were at the ambient temperature of 70° F. at the start of welding. In welding the plates by the shielded metal arc process an electrode giving the following composition of deposited all-weld metal was employed:

| | Percent |
|---|---|
| Nickel | 57.79 |
| Iron | 40.25 |
| Carbon | 0.893 |
| Manganese | 0.72 |
| Silicon | 0.34 |

The electrode employed is preferably one which deposits an all-weld metal wherein the nickel content is not less than 50%.

Weld metal was deposited in the grooved joints in lengths of 3 to 4 inches. Each individual length of weld metal was peened lightly to relieve shrinkage stresses. Interpass temperatures were permitted to rise to 200° F. maximum and 18 passes were made to fill the joint.

After welding the welded plates were sectioned transverse to the length of the welded joint for mechanical testing and the testing results are shown in the following table. The following table also shows the results of comparative tests carried out on the ductile iron of the welded plates.

TABLE.—TENSILE AND BEND TEST RESULTS OF WELDED AND NON-WELDED DUCTILE IRON

|  | Test Number | Strength, p.s.i. | Tensile Strength, p.s.i. | Elongation in 1.4″ percent | Transverse Side Bend Degrees to Fracture |
|---|---|---|---|---|---|
| Welded | 1 |  | 66,400 | 9.3 | 26 |
| Ductile Iron | 2 |  | 66,600 | 8.6 | 32 |
| Ductile Iron Base Metal, Not Welded. | 1 | 43,200 | 63,100 | 25.7 | 50 |
|  | 2 | 43,800 | 36,700 | 25.0 | 44 |

*Tensile test*

The tensile strength of the ductile iron plate material (two specimens) was 63,000 and 63,700 p.s.i. with elongation measured in 1.4 inches of 25.7 and 25.0 percent respectively. The welded specimens on the other hand had tensile strengths of 66,400 and 66,600 p.s.i. (two specimens) with elongation measured in 1.4 inches of 9.3 and 8.6 percent respectively. The fracture in both welded specimens occurred completely outside of the welds thus indicating the high strength and ductility obtained in the welded joint.

*Bend test*

Side-bend specimens ⅜″ inch wide were bent in a guided-bending jig as a further measure of ductility. The specimens were considered to have failed when a fissure of ⅛ inch in length opened on the tension surface of the specimen during bending.

The ductile iron base metal (two specimens) was bent 50° and 44° at failure, whereas the welded specimens bent 26° and 32° at failure. This test again demonstrates the high ductility obtained in welded ductile iron as compared with unwelded ductile iron.

Tests on an all-weld metal sample gave the following results:

(1)

Tensile strength _____ p.s.i.__ 60,800
Yield strength _____ p.s.i.__ 50,200
Elongation in 1.4″ _____ percent__ 8.6

In other tests yield strengths close to 50,000 p.s.i. were obtained.

The percentages of total carbon and manganese in the deposited weld metal may vary over the following ranges:

Percent
Total carbon _____ —1.0 maximum
Manganese _____ —0.5 to 1.0

The welding process described herein is also suitable for welding ductile iron to carbon steel where the carbon steel is of welding grade quality.

I claim:

1. In a method of welding ductile iron by the electric-arc process, the step comprising using a nickel-iron-alloy electrode whose deposited weld metal has a tensile strength of between about 60,000 to about 65,000 p.s.i., a yield strength not exceeding about 52,000 p.s.i., and an elongation of at least 8 percent in 1.4 inches gauge length, and whose composition contains from about 50 to about 58 percent nickel, from about .89 to about 1.0 percent total carbon, from about 0.5 to about 1.0 percent manganese, and the balance substantially iron.

2. A method of welding ductile iron, the method comprising employing an electrode which deposits weld metal of the following composition:

Percent
Nickel _____ 57.79
Iron _____ 40.25
Total carbon _____ 0.893
Manganese _____ 0.72
Silicon _____ 0.34

References Cited by the Examiner
UNITED STATES PATENTS
2,356,822   8/1944   Chyle _____ 219—137

RICHARD M. WOOD, *Primary Examiner.*